(12) United States Patent
Fujita (10) Patent No.: US 8,973,734 B2
(45) Date of Patent: Mar. 10, 2015

(54) DEVICE FOR ALIGNING AND TRANSFERRING ARTICLES

(75) Inventor: Yukihiko Fujita, Osaka (JP)

(73) Assignee: Zuiko Corporation, Osaka (JP)

( * ) Notice: Subject to any disclaimer, the term of this patent is extended or adjusted under 35 U.S.C. 154(b) by 136 days.

(21) Appl. No.: 13/701,855

(22) PCT Filed: Jun. 23, 2011

(86) PCT No.: PCT/JP2011/064431
§ 371 (c)(1),
(2), (4) Date: Dec. 4, 2012

(87) PCT Pub. No.: WO2012/011360
PCT Pub. Date: Jan. 26, 2012

(65) Prior Publication Data
US 2013/0068590 A1   Mar. 21, 2013

(30) Foreign Application Priority Data

Jul. 23, 2010 (JP) ................................. 2010-166032

(51) Int. Cl.
| | | |
|---|---|---|
| *B65G 47/30* | (2006.01) | |
| *B65B 13/20* | (2006.01) | |
| *B65G 47/84* | (2006.01) | |
| *B65B 63/02* | (2006.01) | |
| *B65B 65/08* | (2006.01) | |

(52) U.S. Cl.
CPC .............. *B65B 13/20* (2013.01); *B65G 47/841* (2013.01); *B65B 63/02* (2013.01); *B65B 65/08* (2013.01)
USPC ...... 198/426; 198/430; 198/418.6; 198/468.2

(58) Field of Classification Search
USPC ........ 198/468.2, 468.3, 418.6, 426, 430, 431, 198/867.1, 803.13
See application file for complete search history.

(56) References Cited

U.S. PATENT DOCUMENTS

| | | | | |
|---|---|---|---|---|
| 4,141,193 A | * | 2/1979 | Joa .................................. | 53/529 |
| 4,802,570 A | * | 2/1989 | Hirsch et al. .................. | 414/790 |
| 5,768,856 A | * | 6/1998 | Odenthal ........................ | 53/443 |
| 6,170,635 B1 | * | 1/2001 | Rommelli ..................... | 198/429 |
| 2008/0034709 A1 | * | 2/2008 | Chalendar et al. ........... | 53/383.1 |

FOREIGN PATENT DOCUMENTS

| | | |
|---|---|---|
| JP | 47-47434 B | 11/1972 |
| JP | 02-043132 A | 2/1990 |

(Continued)

OTHER PUBLICATIONS

International Search Report for corresponding International Application No. PCT/JP2011/064431 mailed Sep. 13, 2011.

*Primary Examiner* — Gene Crawford
*Assistant Examiner* — Lester Rushin
(74) *Attorney, Agent, or Firm* — Renner, Otto, Boisselle & Sklar, LLP (57) ABSTRACT

A device for aligning and transferring articles including: a counter 3 for aligning, at a gathering position P, an article set W composed of a predetermined number of uncompressed articles; a discharger 4 for discharging the article set W aligned at the gathering position P to a receiving position P0; and at least one transfer bed for supporting a bottom surface of the article set W and reciprocating between the receiving position P0 and a hand-over position P1, P2, thereby receiving the article set W at the receiving position P0, transferring the article set W to the hand-over position P1, P2, and returning to the receiving position P0. The transfer bed L1, R1 and the second support section 20 for compressing the article set W are driven by first and second motors, respectively.

7 Claims, 11 Drawing Sheets

(56) References Cited

FOREIGN PATENT DOCUMENTS

| JP | 05-262419 A | 10/1993 |
| JP | 2000-024031 A | 1/2000 |
| JP | 2001-519304 A | 10/2001 |
| JP | 2006-264737 A | 10/2006 |
| WO | 99/18021 | 4/1999 |

* cited by examiner

DEVICE FOR ALIGNING AND TRANSFERRING ARTICLES

TECHNICAL FIELD

The present invention relates to a device for aligning and transferring articles for compressing and transferring a large number of articles, such as absorbent articles, aligned together.

BACKGROUND ART

Sanitary products (articles), such as absorbent articles for absorbing body fluid, are gathered and packaged together in sets each including a predetermined number of articles. In this process, the articles are transferred, compressed, and then packaged in the form of article sets, each including a large number of articles gathered together.

CITATION LIST

Patent Literature

[First Patent Document] JP2006-264737 A (Abstract)

The first patent document discloses a technique in which each article set, composed of a predetermined number of articles discharged from a counter, is compressed and transferred to the next step. However, it fails to show a mechanism for compressing the article set.

SUMMARY OF INVENTION

Technical Problem

Conventionally, a cylinder such as an air cylinder is typically used for compressing article sets. However, with compression using a cylinder, it is difficult to control the amount by which the article sets are compressed, and it is also difficult to change the number of articles to be transferred.

Thus, an object of the present invention is to provide a device for aligning and transferring articles, with which it is easy to control the amount by which article sets are compressed, and with which it is possible to easily accommodate changes to the number of articles included in each article set.

Solution to Problem

In order to achieve the object set forth above, a device for aligning and transferring articles of the present invention includes: a counter for aligning, at a gathering position, an article set composed of a predetermined number of uncompressed articles; a discharger for discharging the article set aligned at the gathering position to a receiving position; at least one transfer bed for supporting a bottom surface of the article set and reciprocating between the receiving position and a hand-over position, thereby receiving the article set at the receiving position, transferring the article set to the hand-over position, and returning to the receiving position; a first support section fixed to the transfer bed to be in contact with a first side surface of the article set for supporting the first side surface; a second support section attached to the transfer bed so as to be movable in a direction in which the transfer bed reciprocates for compressing the article set by moving toward the first side surface while being in contact with a second side surface of the article set opposite to the first side surface; a first motor for reciprocally moving the transfer bed; a second motor for reciprocally moving the second support section with respect to the transfer bed while the transfer bed is reciprocally moved; and a control device for controlling a distance between the first support section and the second support section by controlling rotation of the first and second motors.

Advantageous Effects of Invention

Now, as the counter gathers articles at the gathering position, the article set at the gathering position is transferred by the discharger to the receiving position, and the article set is received by the transfer bed. The transfer bed, having received the article set, moves the article set to the hand-over position while the second support section moves toward the first support section, thereby compressing the article set.

In the present invention, the second support section for compressing the article set is moved by a motor, instead of an air cylinder. Thus, by electrically (electronically) controlling the motor, it is possible to minutely and accurately control the amount of displacement of the second support section with respect to the first support section.

In some cases, due to a layout problem, or the like, the transfer bed moves from the receiving position to the hand-over position, and the article set is discharged from the hand-over position. In this case, the article set is compressed while the transfer bed is transferred from the receiving position to the hand-over position. Therefore, the cycle time is short.

DESCRIPTION OF EMBODIMENTS

In a preferred embodiment of the present invention, the control device controls rotation of the second motor so that the second support section moves closer to the first support section to compress the article set while the transfer bed transfers the article set from the receiving position to the hand-over position; and the control device controls rotation of the second motor so that the second support section moves away from the first support section in preparation for receiving the article set at the gathering position between the first support section and the second support section, while the transfer bed returns from the hand-over position to the receiving position.

In a further preferred embodiment of the present invention, the at least one transfer bed comprises a first transfer bed and a second transfer bed, with the first and second motors provided for each of the transfer beds; the first transfer bed supports a bottom surface of one article set and reciprocates between the receiving position and first hand-over position, thereby receiving the one article set at the receiving position and transferring the one article set to the first hand-over position; and the second transfer bed supports a bottom surface of another article set and reciprocates between the receiving position and a second hand-over position, thereby receiving the other article set at the receiving position and transferring the other article set to the second hand-over position.

In this case, while one transfer bed discharges a preceding article set downstream at the hand-over position, the other transfer bed can simultaneously receive the next article set at the receiving position.

In a further preferred embodiment of the present invention, the device further includes: a first driving wheel attached to a first output shaft of each first motor; a second driving wheel attached to a second output shaft of each second motor; a first driven wheel provided for each first driving wheel; a second driven wheel provided for each second driving wheel; a first belt wound around between each first driving wheel and the first driven wheel for transmitting power for moving the transfer bed; and a second belt wound around between each second driving wheel and the second driven wheel for transmitting power for moving the second support section, wherein: the first and second driven wheels with the first and second belts wound therearound for transmitting power to the first transfer bed and the second support section thereof are rotatably attached to the first output shaft of the first motor for moving the second transfer bed; and the first and second driven wheels with the first and second belts wound therearound for transmitting power to the second transfer bed and the second support section thereof are rotatably attached to the first output shaft of the first motor for moving the first transfer bed.

In this case, the output shaft of the first motor serves also as a support shaft for rotatably supporting the driven wheel. Thus, the structure of the device is simplified.

In another preferred embodiment of the present invention, the counter aligns together articles to be the article set while moving the articles from upstream to downstream along a reciprocation direction of the transfer bed; and the discharger includes a guide rail diagonally inclined toward an article transfer direction of the counter as the guide rail extends from the gathering position toward the receiving position, and a pusher for moving diagonally in a direction in which the guide rail extends, thereby pushing out the article set toward the receiving position.

In this case, the article set is diagonally transferred along the guide rail from the gathering position toward the receiving position. Thus, the counter can transfer articles without stopping.

In yet another preferred embodiment of the present invention, the device further includes: a driving wheel attached to an output shaft of the second motor; a driven wheel provided for each driving wheel; a belt wound around between the driving wheel and the driven wheel for transmitting power for moving the second support section; a movable bracket connecting between the belt and the second support section for reciprocally moving the second support section using rotation of the second motor via the belt; and a slit formed in the transfer bed, extending in a direction in which the transfer bed reciprocates, wherein: the driving wheel, the driven wheel and the belt are arranged at a position below the transfer bed; the second support section is arranged above the transfer bed; and the bracket is running through the slit in an up-down direction, whereby the belt below the transfer bed and the second support section above the transfer bed are coupled together.

If the second motor for moving the second support section is provided on the transfer bed, it will reduce the effective space of the transfer bed. It will also make it necessary to movably provide a communication line for controlling the second motor or a power supply cable for driving the second motor, or it will require a trolley.

In contrast, in the present embodiment, the second motor, as is the first motor, can be a stationary motor placed on the floor surface, or the like. Thus, the effective space of the transfer bed is large, and the electric wiring structure is simple.

The present invention will be understood more clearly from the following description of preferred embodiments taken in conjunction with the accompanying drawings. Note however that the embodiments and the drawings are merely illustrative, and the scope of the present invention shall be defined only by the appended claims. In the accompanying drawings, like reference numerals denote like components throughout the plurality of figures.

EMBODIMENTS

An embodiment of the present invention will now be described with reference to the drawings.

Note that as the articles, the present invention is directed to sanitary products, such as disposable diapers, pants, or sanitary napkins (disposable worn articles), for example.

Figure 1A:
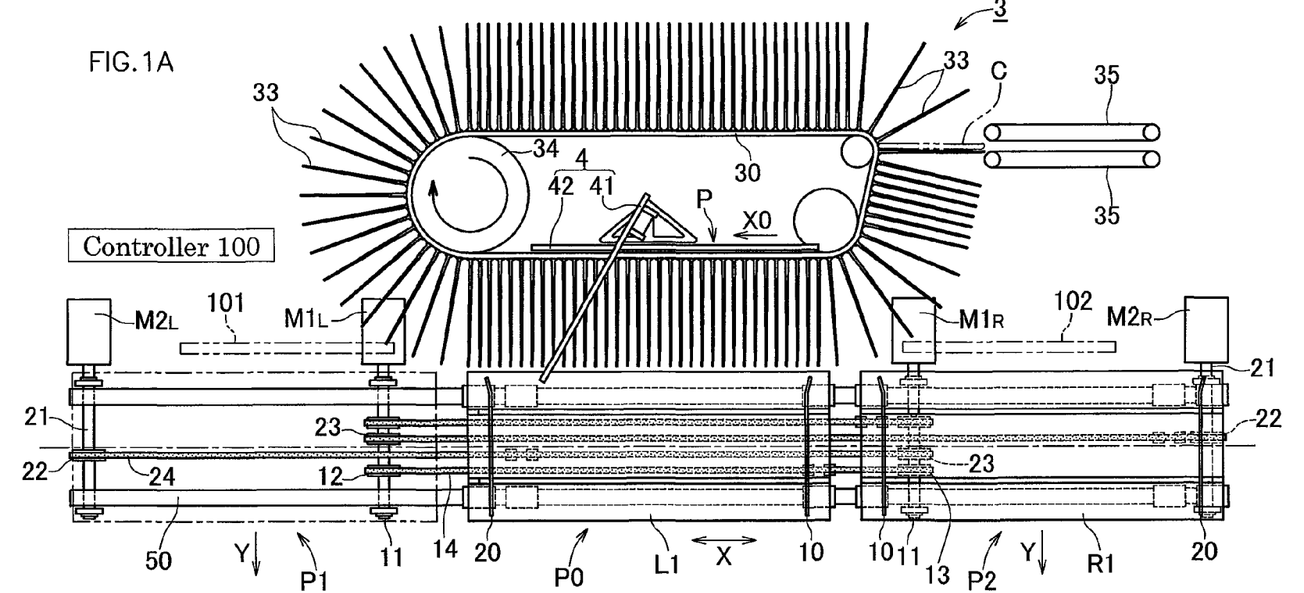
FIG. 1A is a schematic plan view showing an embodiment of a device for aligning and transferring articles of the present invention.

As shown in FIG. 1A, the present device for aligning and transferring articles includes a collecting section including a counter 3 and a discharger 4, and a compressing/transferring section including first and second transfer beds L1 and R1.

The counter 3 aligns and gathers articles C while moving the articles C along the reciprocation direction X of the transfer beds L1 and R1.

Figure 7A:
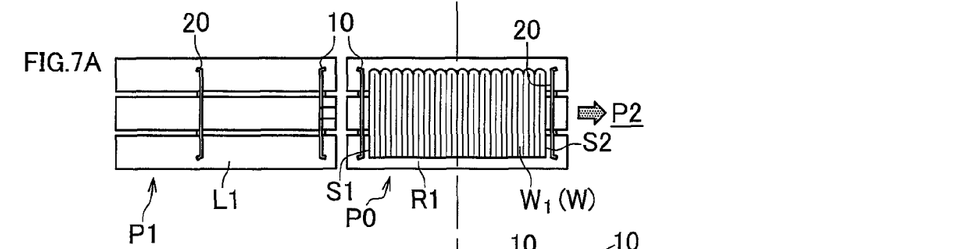
FIGS. 7A to 7F are plan views showing a procedure of transferring article sets.

The counter 3 includes a large number of dividers 33 attached to an endless belt 30 at predetermined intervals, and the rotation of a drive roller 34 rotates the dividers 33 in the article C transfer direction X0. The articles C are fed one after another by a pair of transfer belts 35 into between the dividers 33 and 33, upstream of the gathering position P. Therefore, at the gathering position P, an article set W is aligned and gathered as shown in FIG. 7A, including a predetermined number of articles C gathered.

Note that a method of gathering the article set W is described in detail in JP2006-264737A, supra, the disclosure of which is herein incorporated by reference.

In FIG. 1A, the discharger 4 is provided at the gathering position P.

The discharger 4 discharges the article set W, which has been aligned and gathered at the gathering position P, toward the receiving position P0 downstream.

The discharger 4 includes a guide rail 41 and a pusher 42. The guide rail 41 diagonally inclined in the downstream direction along the article C transfer direction X0 of the counter 3 as it extends from the gathering position P toward the receiving position P0. The pusher 42 diagonally moves diagonally in a direction in which the guide rail 41 extends, thereby pushing out the article set W toward the receiving position P0. The velocity component of the pusher 42 in the transfer direction X0 is set to be equal to the velocity of the divider 33. Note that the articles C and C of the article set W pushed out by the receiving position P0 are uncompressed.

The pair of transfer beds L1 and R1 include three bed plates 51 for supporting a bottom surface Wb (FIG. 4B) of the article set W, and first and second support sections 10 and 20 to be in contact with first and second side surfaces S1 and S2 of the article set W of FIG. 7A for supporting the first and second side surfaces S1 and S2. Note that at the receiving position P0 shown in FIG. 7A, no compression force from the first support section 10 is acting upon the first side surface S1 of the article set W, and no compression force from the second support section 20 is acting upon the second side surface S2 of the article set W.

As shown in FIGS. 7A to 7F, the first transfer bed L1 reciprocates between the receiving position P0 and a first hand-over position P1, thereby receiving the article set W at the receiving position P0 and transferring the article set W to the first hand-over position P1.

On the other hand, as shown in FIGS. 7A to 7E, the second transfer bed R1 reciprocates between the receiving position P0 and a second hand-over position P2, thereby receiving the article set W at the receiving position P0 and transferring the article set W to the second hand-over position P2.

Figure 2A:
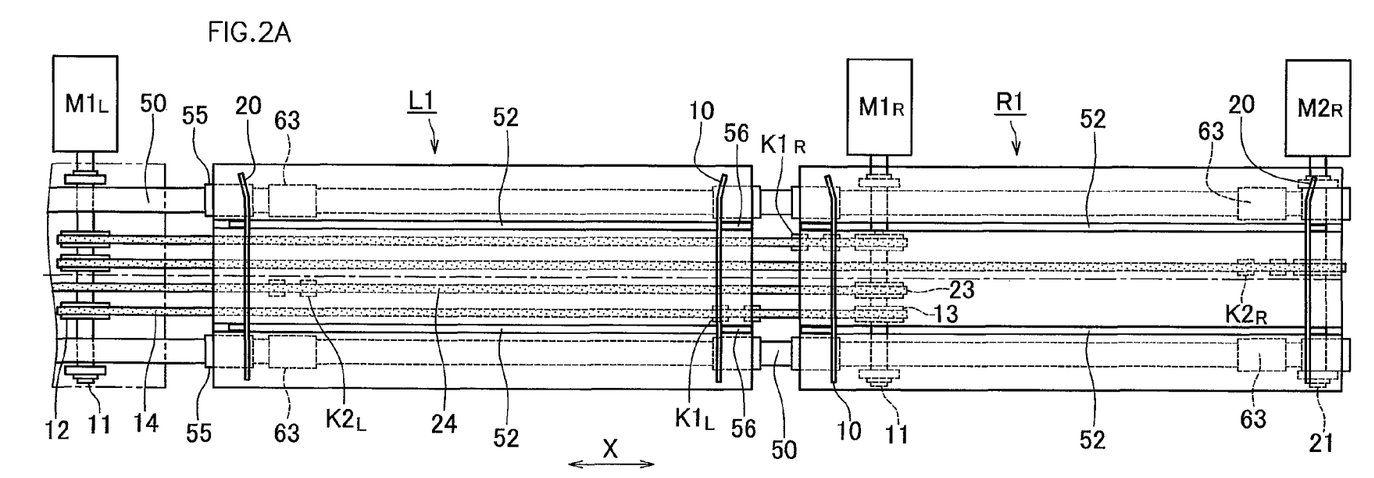
FIG. 2A is a schematic plan view showing first and second transfer beds.
Figure 2B:
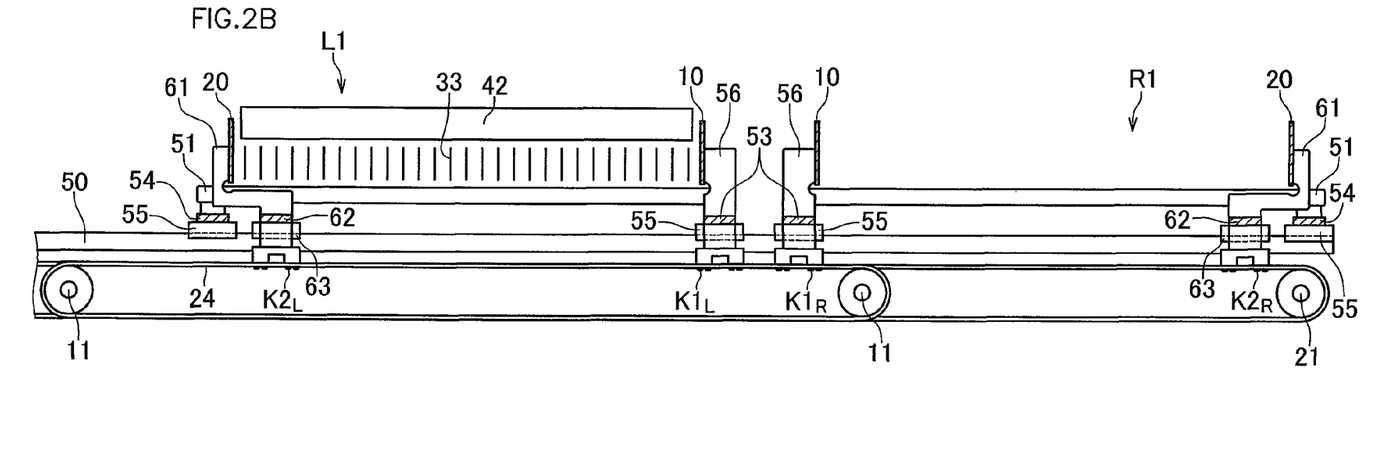
FIG. 2B is a schematic front view showing the same.

As shown in FIGS. 2A and 2B, the first and second transfer beds L1 and R1 have essentially the same structure, and the first transfer bed L1 will be described below.

Figure 6A:
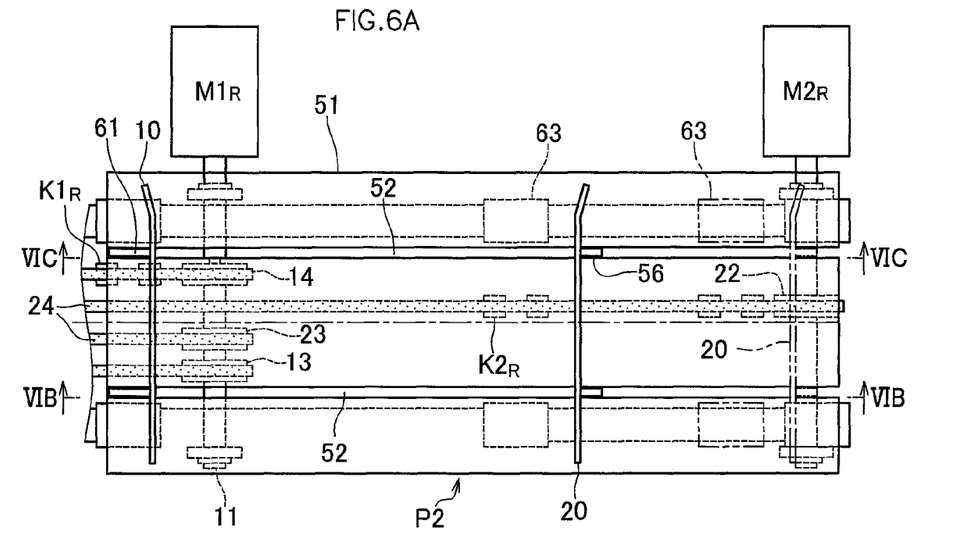
FIG. 6A is a schematic plan view showing the second transfer bed.
Figure 6B:
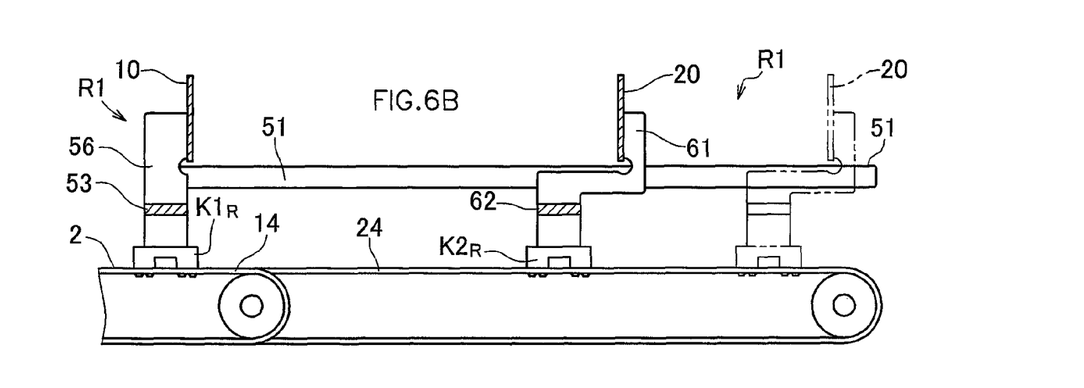
FIG. 6B is a cross-sectional view taken along line VIB-VIB.
Figure 6C:
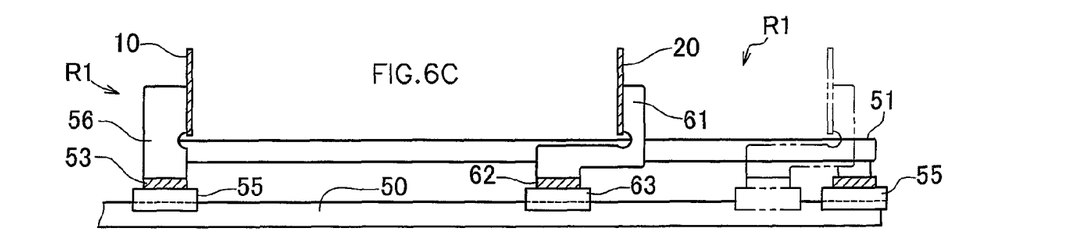
FIG. 6C is a cross-sectional view taken along line VIC-VIC.

Note that the structure of the second transfer bed R1 is shown in FIGS. 6A to 6C. As shown in FIG. 1A, the receiving position P0 is arranged between the first hand-over position P1 and the second hand-over position P2.

Figure 3:
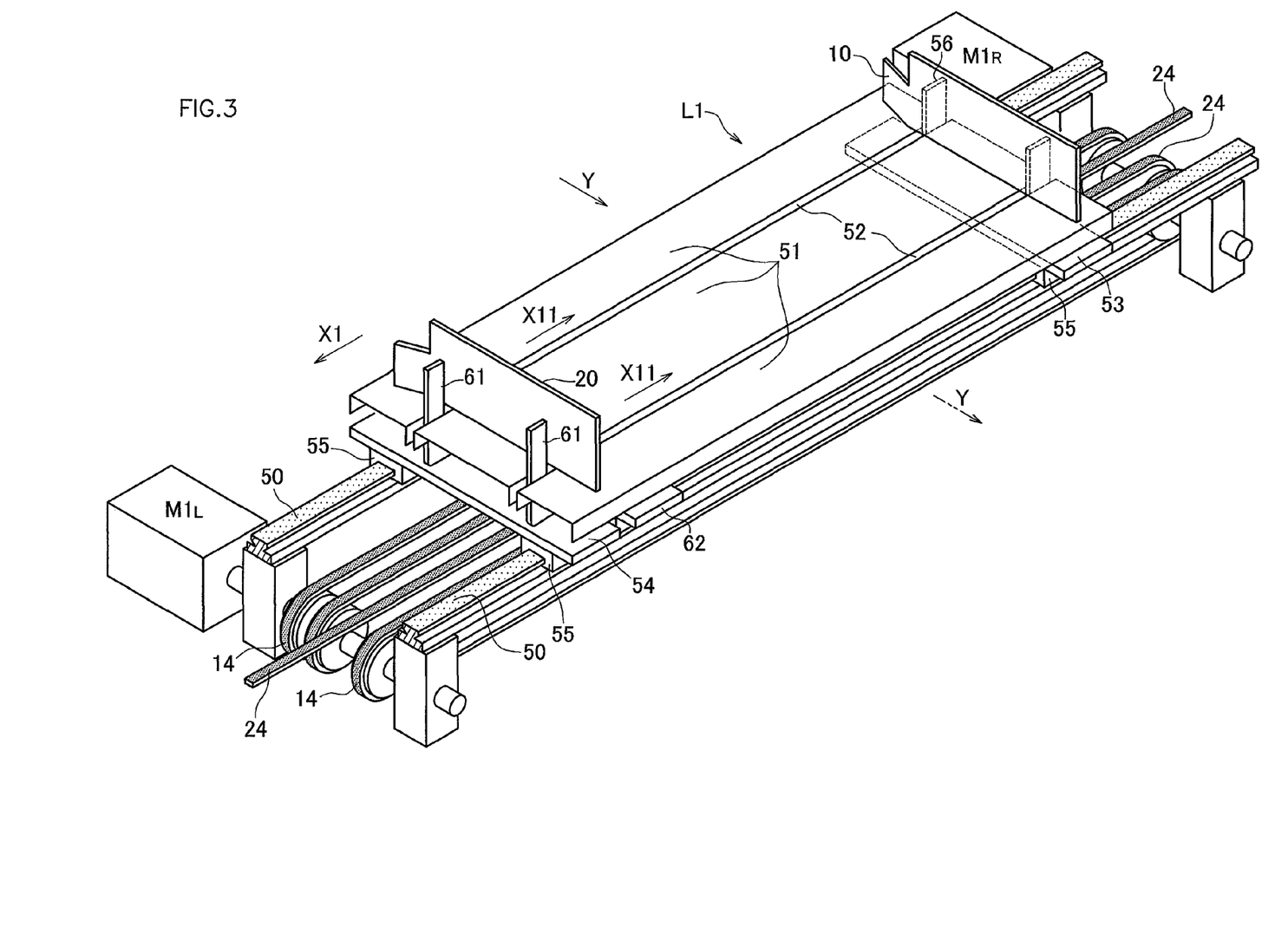
FIG. 3 is a schematic perspective view showing the first transfer bed.

As shown in FIG. 3, the bed plate 51 is divided in three, and has a pair of slits 52 extending in the article set compression direction X11 of the first transfer bed L1. The bed plate 51 divided in three is assembled into an integral unit by first and second coupling members 53 and 54, which are perpendicular to the compression direction X11 and extending in the article set entering direction Y and the article set discharging direction Y.

The first transfer bed L1 includes a sliding section (guided section) 55 fixed to the first and second coupling members 53 and 54. The sliding section 55 slides along a transfer rail 50 extending along the transfer direction X1 of the article set W. Note that in FIG. 3, the surface of the rail 50 is dotted.

Figure 4A:
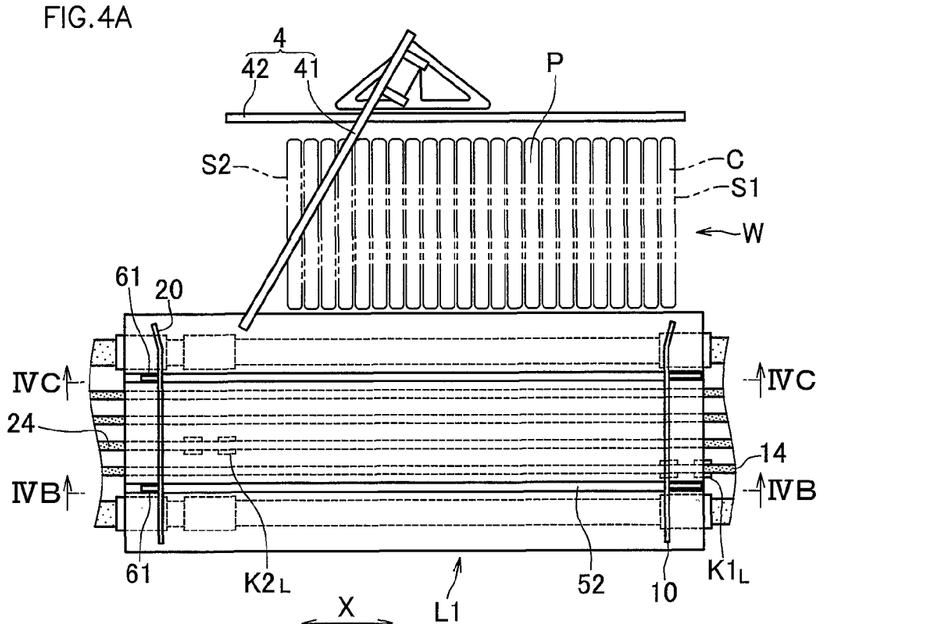
FIG. 4A is a schematic plan view showing the same.
Figure 4B:
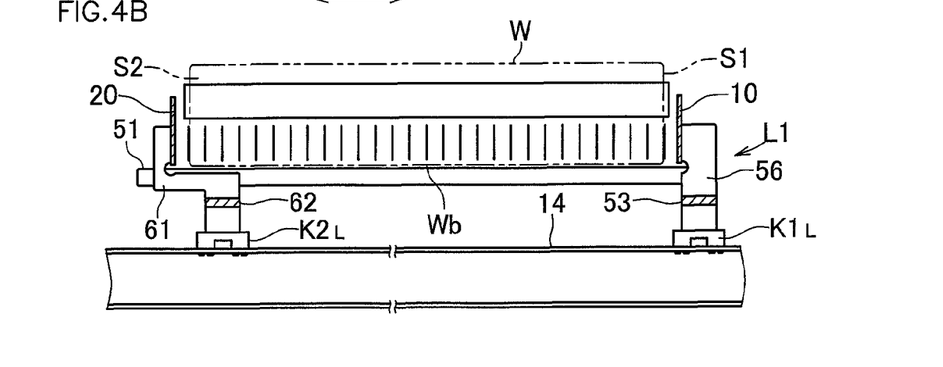
FIG. 4B is a cross-sectional view taken along line IVB-IVB.

The first support section 10 is coupled to a first belt 14 via a first clamp $K1_L$ and a fixed bracket 56 of FIGS. 4A and 4B. With the rotation of the first belt 14, the first transfer bed L1 is reciprocally moved in the X direction by the first driving device to be described later together, with the first support section 10.

Note that in various figures, the surfaces of the first belt 14 and a second belt 24 to be described later are dotted for easier understanding of the figures.

The first support section 10 and the second support section 20 oppose each other, and the first support section 10 is fixed to the first transfer bed L1 whereas the second support section 20 is provided so as to be reciprocally movable with respect to the first transfer bed L1 in the compression direction X11 (FIG. 3) and in the opposite direction.

The second support section 20 is coupled to the second belt 24 via a second clamp $K2_L$ and a movable bracket 61 of FIGS. 4A and 4B. With the rotation of the second belt 24, the second support section 20 is reciprocally moved in the X direction by the second driving device, which is different from the first driving device of the first transfer bed L1.

The slits 52 are provided so as to extend across an entire area of the first transfer bed L1 in the X direction. Therefore, the second support section 20 is reciprocally movable across generally the entire area of the first transfer bed L1 in the reciprocation direction X, i.e., between one end portion of the first transfer bed L1 to a position in contact with the first support section 10.

Figure 4C:
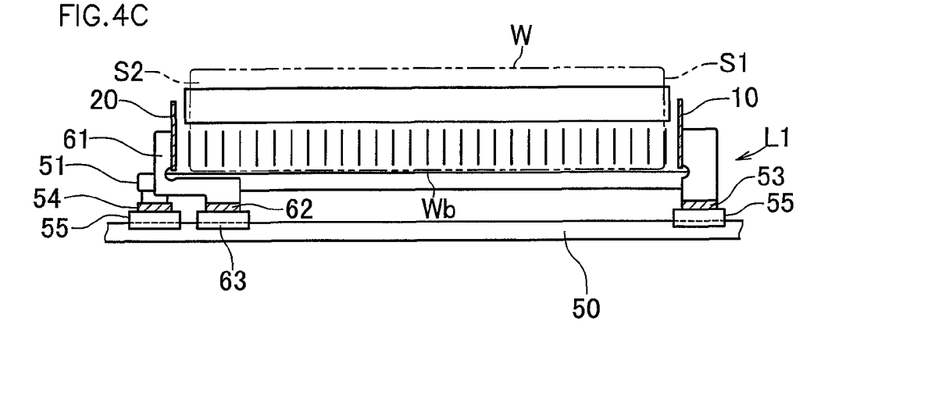
FIG. 4C is a cross-sectional view taken along line IVC-IVC.

As shown in FIGS. 4B and 4C, the first support section 10 is in contact with the first side surface S1 of the article set W and supports the first side surface S1.

Figures 7B, 7C:
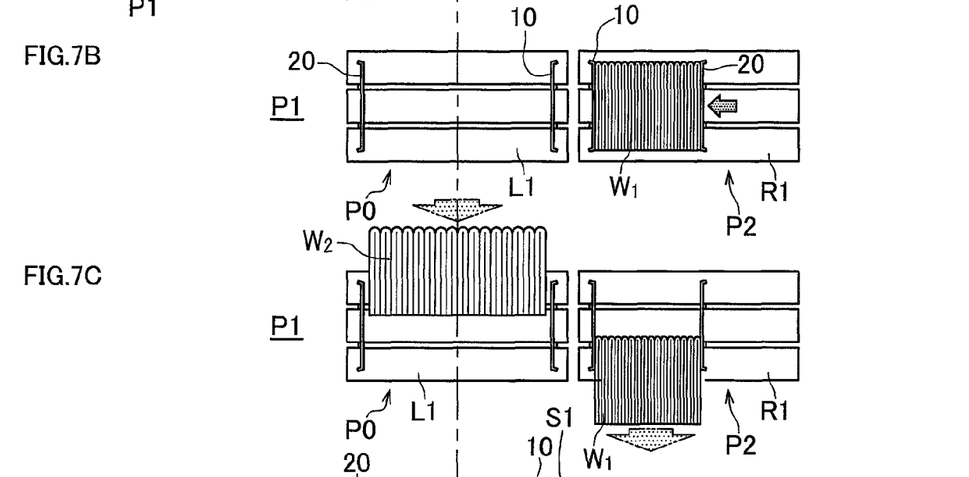
Figure 7D:
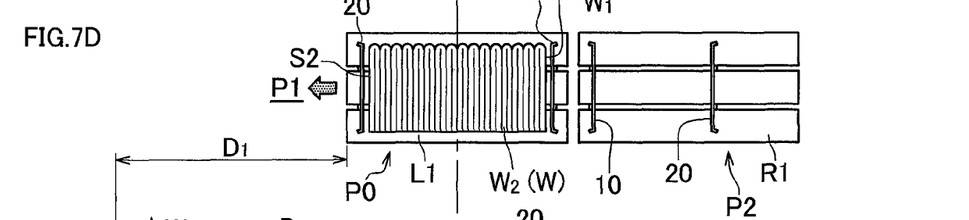
Figure 7E:
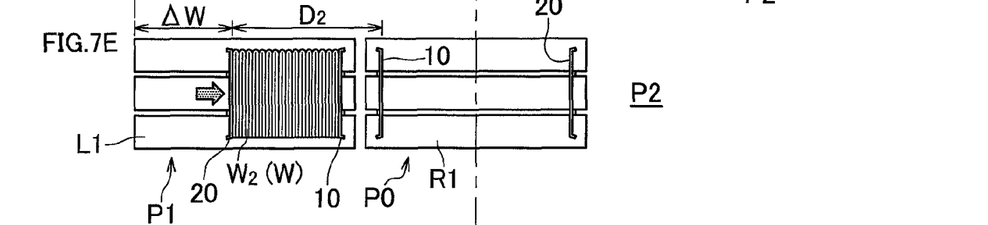
Figure 7F:
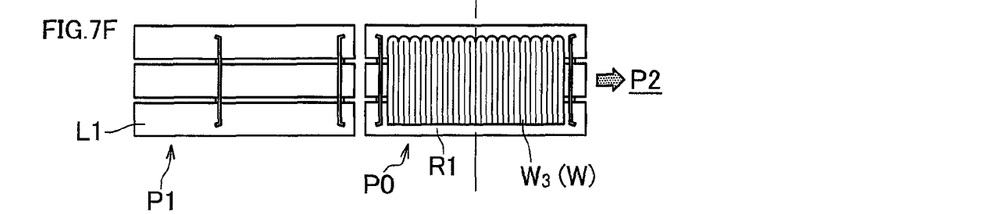

On the other hand, the second support section 20 compresses the article set W by moving toward the first side surface S1 as shown in FIGS. 7D to 7E, while in contact with the second side surface S2 of the article set W opposite to the first side surface S1.

Figure 5:
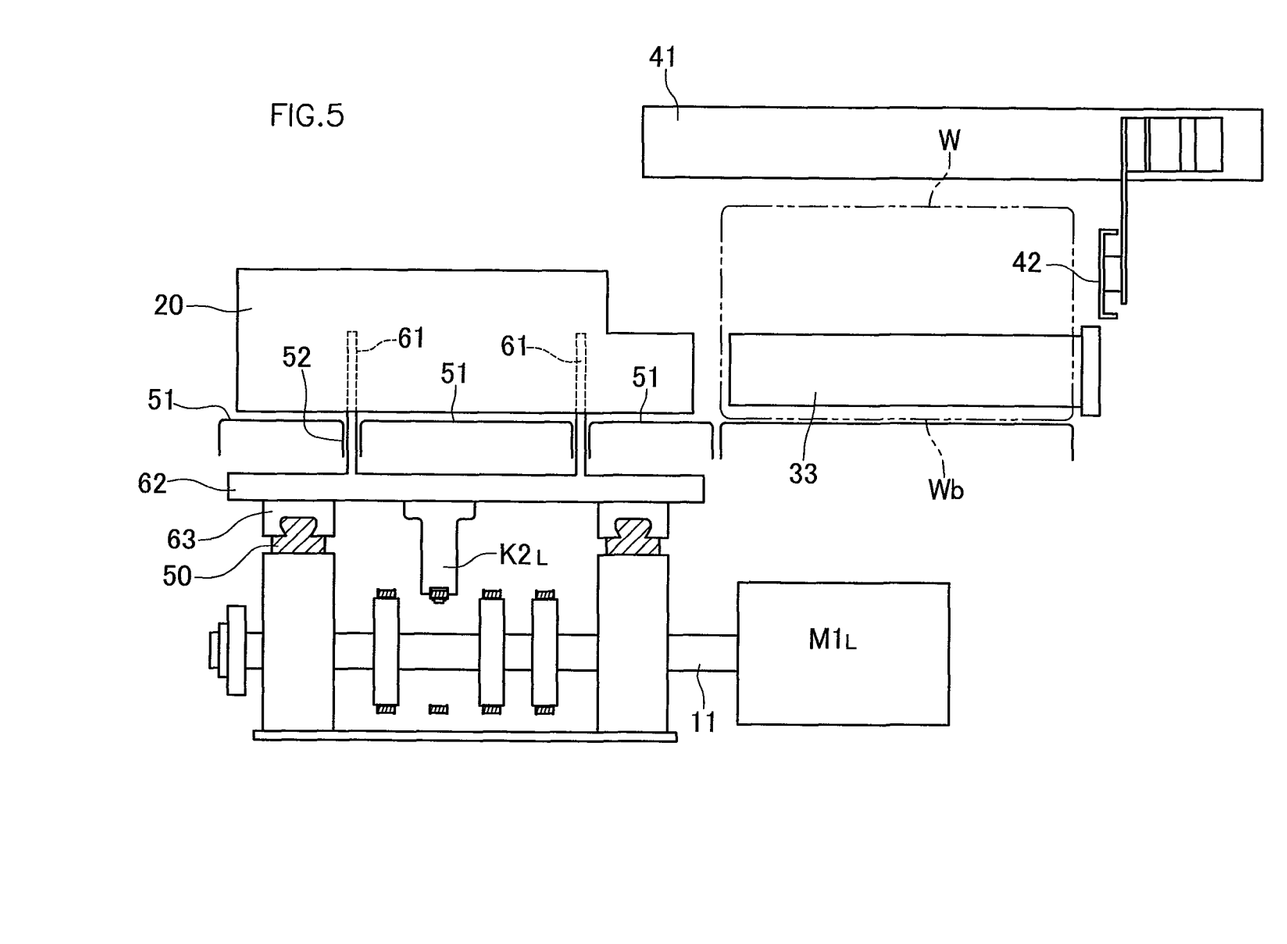
FIG. 5 is a transverse cross-sectional view showing the same.

In FIGS. 3 and 5, the second support section 20 is fixed to a movable beam 62 of FIG. 4C via the movable bracket 61 running through the slits 52 in the up-down direction. Another sliding section 63 is fixed to the movable beam 62. The other sliding section 63 slides along the rail 50.

Next, devices for driving the first transfer bed L1 and the second support section 20 will be described.

In FIG. 1A, the first transfer bed L1 (the second transfer bed R1) is reciprocally moved by a first motor $M1_L$ (a second motor $M1_R$). On the other hand, the second support section 20 of the first transfer bed L1 (the second transfer bed R1) is reciprocally moved on the first transfer bed L1 (the second transfer bed R1) by a second motor $M2_L$ (a second motor $M2_R$).

Servo motors may be employed as the first and second motors, and they are stationary motors which are not mounted on the transfer beds L1 and R1. Note that the devices for driving the first and second transfer beds L1 and R1 have substantially the same structure, and only the first transfer bed L1 will be described while omitting the description of the structure of the device for driving the second transfer bed R1.

A first driving wheel 12 is attached to a first output shaft 11 of the first motor $M1_L$ of FIG. 2A. The endless first belt 14 is wound around the first driving wheel 12. The first coupling member 53 (FIG. 2B) is coupled to the first belt 14 via the first clamp $K1_L$. Therefore, by the drive of the first motor $M1_L$, the first output shaft 11, the first driving wheel 12 and the first belt 14 are rotated, thereby reciprocally moving the first transfer bed L1 and the first support section 10 fixed to the first coupling member 53 (FIG. 2B) in the X direction.

The first belt 14 is wound around a first driven wheel 13, which is provided for each first driving wheel 12, and the first driving wheel 12. The first driven wheel 13 is rotatably attached to the first output shaft 11 of the first motor M1R for reciprocally moving the second transfer bed R1 on the right side.

A second driving wheel 22 is attached to a second output shaft 21 of the second motor $M2_L$, of FIG. 1A. The endless second belt 24 is wound around the second driving wheel 22. The movable beam 62 (FIG. 2B) is coupled to the second belt 24 of FIG. 2A via the second clamp $K2_L$. Therefore, by the drive of the second motor $M2_L$ of FIG. 1, the second output shaft 21, the second driving wheel 22 and the second belt 24 are rotated, thereby reciprocally moving the second support section 20, together with the second clamp $K2_L$, the movable beam 62 and the movable bracket 61 of FIG. 4B, in the X direction.

The second belt 24 of FIG. 1A is wound around a second driven wheel 23, which is provided for each second driving wheel 22, and the second driving wheel 22. The second driven wheel 23 is rotatably attached to the first output shaft 11 of the first motor M1R for reciprocally moving the second transfer bed R1 on the right side.

The driving wheels 12 and 22, the driven wheels 13 and 23, and the belts 14 and 24 are arranged at positions below the transfer beds L1 and R1. On the other hand, the second support section 20 is arranged above the transfer beds L1 and R1. The movable bracket 61 of FIG. 3 is running through the slits 52 in the up-down direction, whereby the belt 24 below the transfer beds L1 and R1 (FIG. 1A) and the second support section 20 above the transfer beds are coupled together.

In FIG. 1A, the present device for aligning and transferring articles includes first and second dischargers 101 and 102 for discharging the article sets W (FIG. 4B), transferred to the first hand-over position P1 and the second hand-over position P2, in the direction of the arrow Y.

Next, a control device 100 for controlling the present device for aligning and transferring articles will be described.

The control device 100 controls the rotation of the first and second motors as follows, thereby controlling the distance between the first support section 10 and the second support section 20 and compressing the article set W. Also for the control of compression of the article set W using the motors, the description will be directed to the first and second motors $M1_L$ and $M2_L$ of the first transfer bed L1 on the left.

The first motor $M1_L$ reciprocally moves the first support section 10 and the first transfer bed L1 at a predetermined first velocity V1. On the other hand, the second motor $M2_L$ reciprocally moves the second support section 20 at a predetermined second velocity V2. The first velocity V1 is greater than the second velocity V2, and therefore the traveling distance D1 of the first support section 10 and the first transfer bed L1 is greater than the traveling distance D2 of the second support section 20 as shown in FIGS. 7D and 7E. Thus, as the first transfer bed L1 moves from the receiving position P0 to the first hand-over position P1, the article set W is compressed.

In this case, the first and second motors $M1_L$ and $M2_L$ may start rotating simultaneously and stop rotating simultaneously, but the time of start and stop may slightly differ therebetween.

That is, the control device 100 controls the rotation of the first and second motors $M1_L$ and $M2_L$ (FIG. 1) so that the second support section 20 moves closer to the first support section 10 so as to compress the article set W while the transfer bed L1 transfers the article set W from the receiving position P0 to the hand-over position P1.

Next, another method for controlling the motors will be described.

The first velocity V1 and the second velocity V2 may be an equal velocity, and the amount of time of activation may differ therebetween. For example, the second motor $M2_L$ may start rotating after the start of rotation of the first motor $M1_L$, and the first motor $M1_L$ may stop rotating after the stop of rotation of the second motor $M2_L$. In this case, the difference in the amount of time over which the motor is rotated results in D1>D2, thereby compressing the article set W while the first transfer bed L1 moves from the receiving position P0 to the first hand-over position P1.

That is, the amount of compression ΔW of the article set W of FIG. 7E is expressed by Expression (1) below.

$$\Delta W = D1 - D2 = (V1_m \cdot T1) \cdot G - (V2_m \cdot T2) \cdot G \quad (1)$$

where $V1_m$: Average rotation speed of first motor $M1_L$
$V2_m$: Average rotation speed of second motor $M2_L$
T1: Rotation time of first motor $M1_L$
T2: Rotation time of second motor $M2_L$
G: Constant (deceleration ratio)

As a control method, the number of rotations (rotation angle) from start to stop may be prescribed for the first motor $M1_L$ and for the second motor $M2_L$, thereby controlling the amount of compression ΔW based on the difference in the number of rotations.

Next, a method for transferring and compressing the article set W with the present device for aligning and transferring articles will be described.

When a predetermined number of articles C gather at the gathering position P of FIG. 4A, the pusher 42 of the discharger 4 moves along the longitudinal direction of the guide rail 41, thereby transferring the article set W onto the first or second transfer bed L1, R1.

The operations after the state where an uncompressed article set W is placed on the second transfer bed R1 as shown in FIG. 7A will be described below.

The first and second transfer beds L1 and R1 of FIG. 7A move from the first hand-over position P1 and the receiving position P0, respectively, to the receiving position P0 and the second hand-over position P2, respectively, of FIG. 7B (to the right). During this move, the second support section 20 of the second transfer bed R1 of FIG. 7A moves closer to the first support section 10 as shown in FIG. 7B, thereby compressing the preceding article set $W_1$.

In this process, the second support section 20 of the first transfer bed L1 of FIG. 7A moves away from the first support section 10 as shown in FIG. 7B in preparation for receiving the next article set $W_2$.

That is, the control device 100 controls the rotation of the first and second motors $M1_L$ and $M2_L$ so that the second support section 20 moves away from the first support section 10 while the transfer bed L1 returns from the hand-over position P1 to the receiving position P0 in preparation for receiving the article set W at the gathering position P between the first support section 10 and the second support section 20.

Note that the control of the motors is substantially the same as that described above for compression, and will not be further described below.

As shown in FIG. 7C, the preceding article set $W_1$, which has been compressed, is pushed by the second discharger 102 (FIG. 1A) at the second hand-over position P2 to be discharged from the second hand-over position P2. Simultaneously with the discharge, the next article set $W_2$ is loaded onto the first transfer bed L1 at the receiving position P0 from the gathering position P (FIG. 1A).

Then, the first and second transfer beds L1 and R1 of FIG. 7D move from the receiving position P0 and the second hand-over position P2, respectively, to the first hand-over position P1 and the receiving position P0, respectively, of FIG. 7E (to the left). During this move, the second support section 20 of the first transfer bed L1 of FIG. 7D moves closer to the first support section 10 as shown in FIG. 7E, thereby compressing the article set $W_2$.

Note that in this process, the second support section 20 of the second transfer bed R1 of FIG. 7D moves away from the first support section 10 as shown in FIG. 7E in preparation for receiving the next article set $W_3$.

Then, as shown in FIG. 7, the article set $W_2$ on the first transfer bed L1 is pushed by the first discharger 101 (FIG. 1A) to be discharged from the first hand-over position P1, as described above, and further the next article set $W_3$ is loaded onto the second transfer bed R1. Thereafter, the operations of FIGS. 7A to 7E are repeated.

Thus, the compression and the transfer of article sets W are performed simultaneously, and the loading of the article set W to the receiving position P0 and the discharge of the article set W from the first or second hand-over position P1 or P2 are performed simultaneously. Therefore, the cycle time for receiving from the counter 3 (FIG. 1A), transferring, compressing, and discharging from the hand-over position is shortened.

Note that as shown in FIGS. 7A to 7F, the position of the second support section 20 with respect to the transfer bed L1, R1 differs depending on whether the transfer bed L1, R1 has reached the receiving position P0 or the hand-over position P1, P2. That is, although the position of the second support section 20 of the second transfer bed R1 of FIG. 1A would be closer to the first support section 10 as shown in FIGS. 6A to 6C at the second hand-over position P2, the two transfer beds are shown to be symmetric in FIGS. 1A to 2B for easier understanding of the structure of the first and second transfer beds L1 and R1.

Figure 8A:
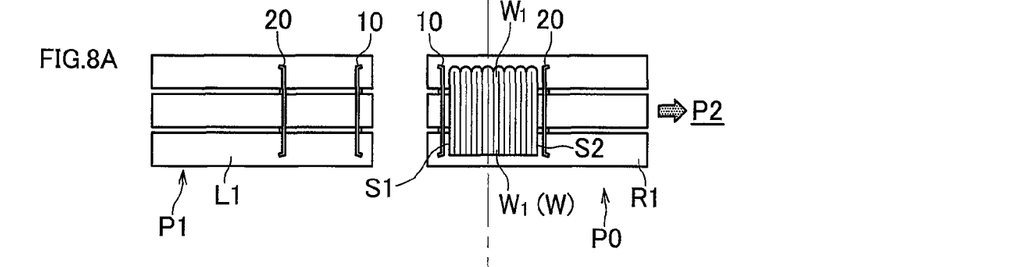
FIGS. 8A to 8F are plan views showing a procedure of transferring article sets.
Figure 8B:
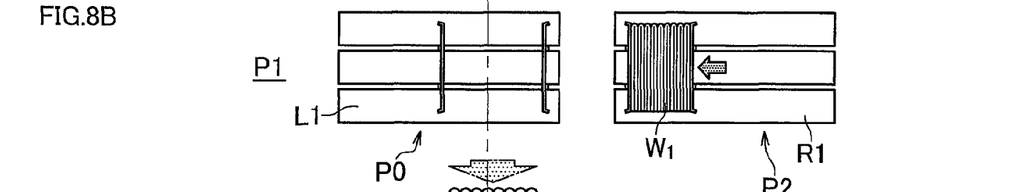
Figure 8C:
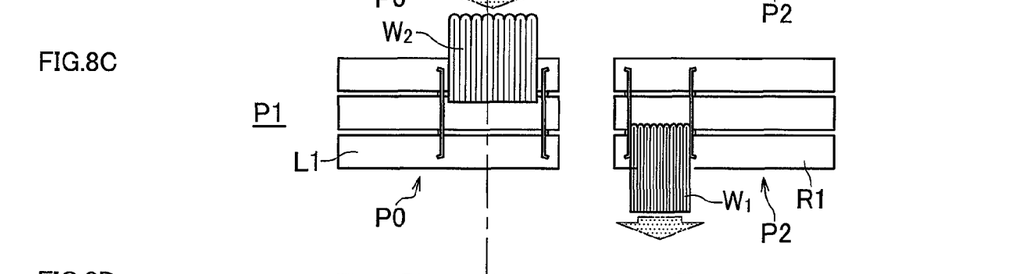
Figure 8D:
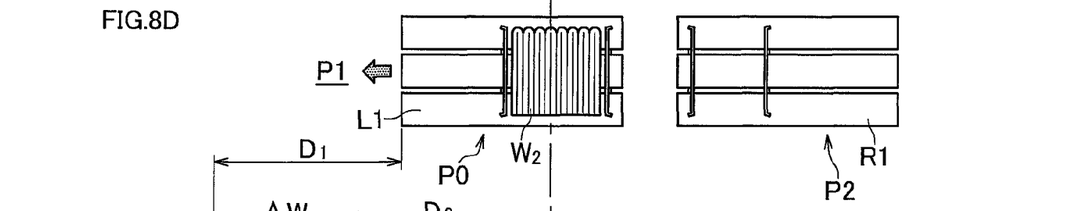
Figure 8E:
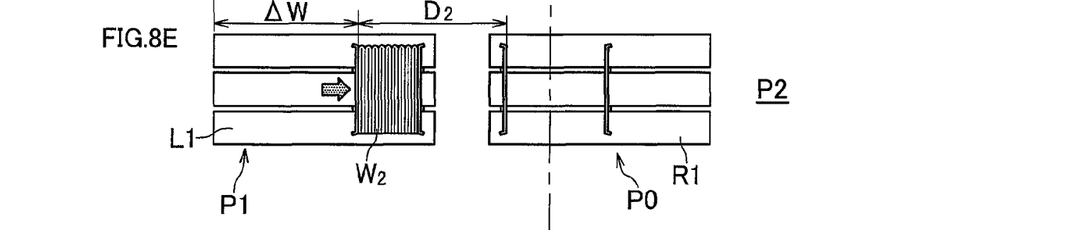
Figure 8F:
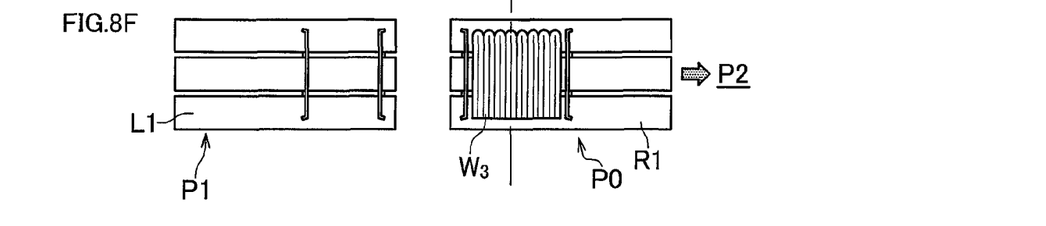

Next, a case where the width of the article set W of FIG. 8A is small will be described.

In this case, as shown in FIG. 8A, the distance between the first support section 10 and the second support section 20 is different from that when the width of the article set W is large as shown in FIG. 7.

That is, when the width of the article set W is small, the second support section 20 is moved in advance to a position closer to the first support section 10 at the receiving position P0, and the second support section 20 is moved to, a position even closer to the first support section 10 at the hand-over position P1, P2.

Note that these positions of the second support section 20 may be pre-set for each article set W.

Thus, since the present device for aligning and transferring articles moves the transfer beds L1 and R1 and the second support section 20 using the first and second motors, it is possible to easily accommodate changes to the width of the article set W.

Note that while the transfer bed is provided with slits, whereby the belt below the transfer bed and the second support section above the transfer bed are coupled together in the embodiment described above, the second support section and the movable beam may be formed to be larger than the width of the transfer bed and may be coupled together beside the transfer bed, instead of providing the slits. Also in such a case, the second motor for moving the second support section can be a stationary motor which is fixed on the floor surface directly or with a motor bed, or the like, interposed therebetween.

Figure 9:
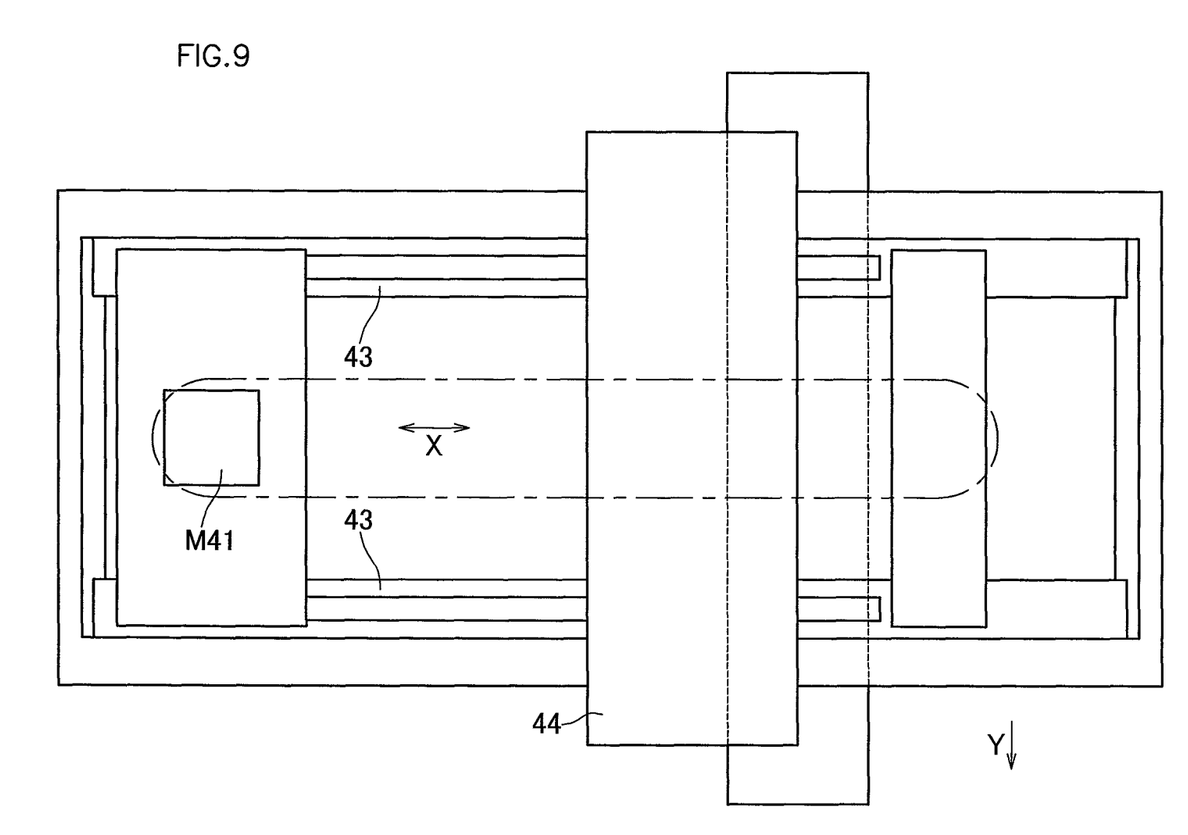
FIG. 9 is a plan view showing another example of a discharger.
Figure 10:
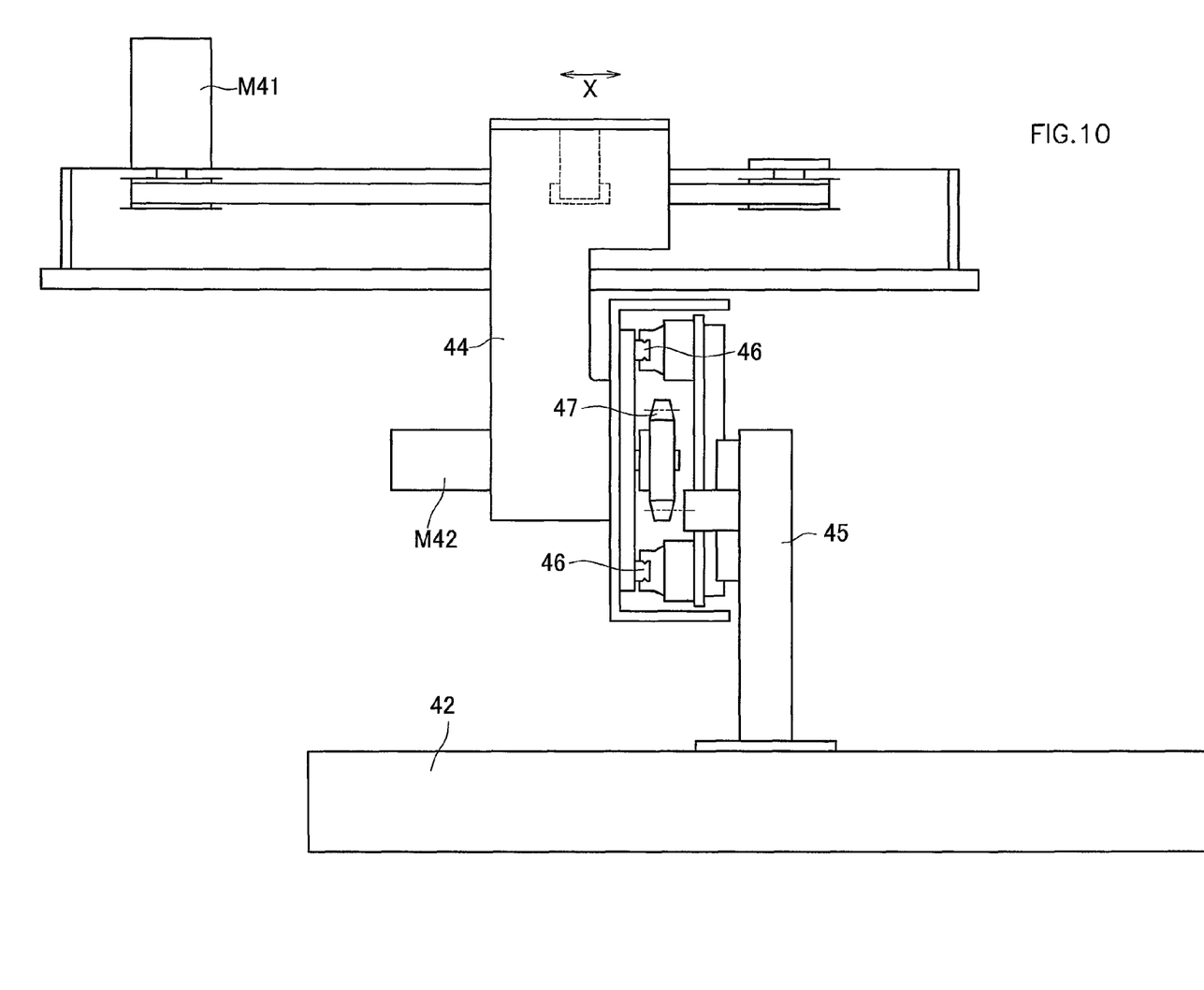
FIG. 10 is a front view showing the same.
Figure 11:
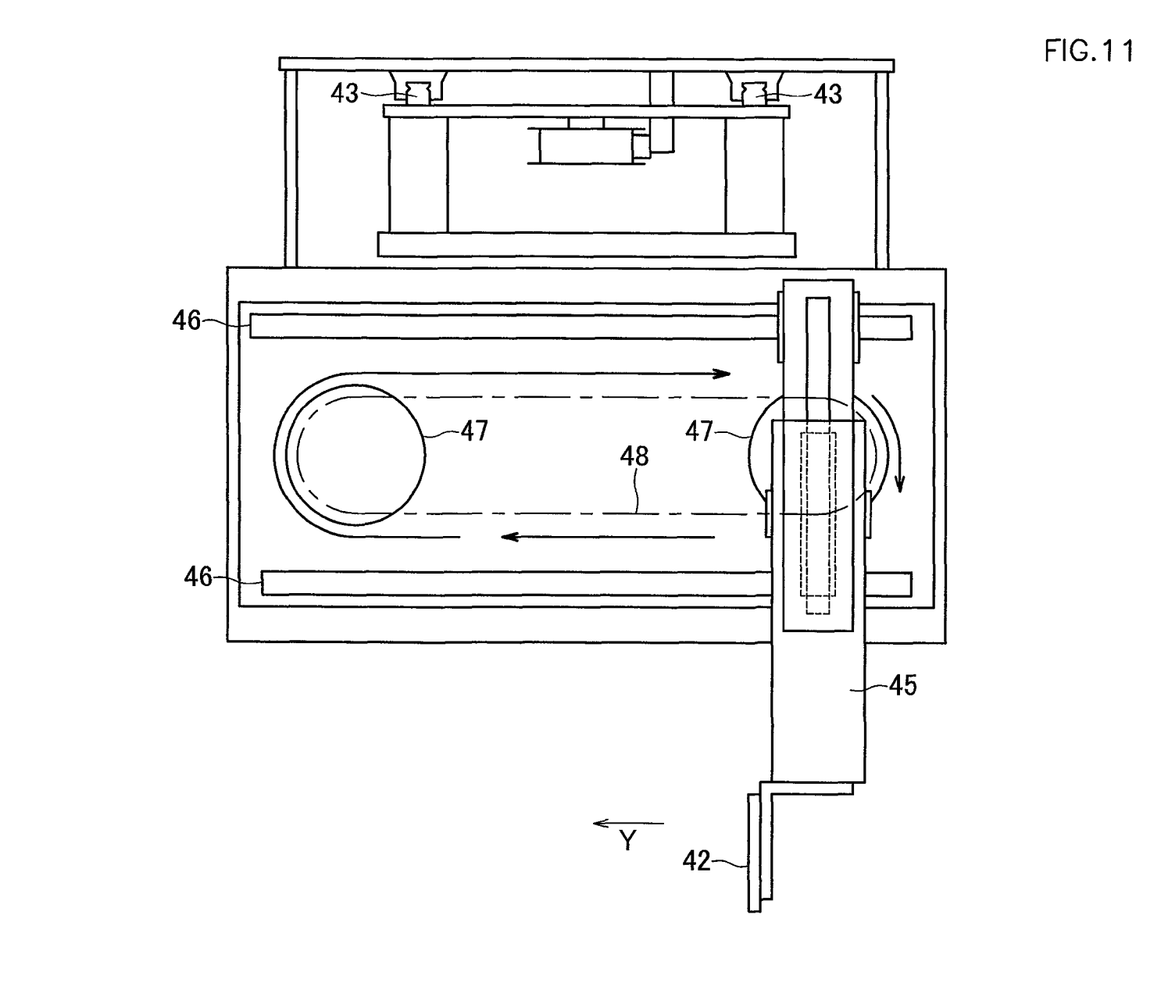
FIG. 11 is a side view showing the same.

FIGS. 9 to 11 show another example of the discharger 4.

The discharger 4 includes a first discharge motor M41 for moving the pusher 42 in the X direction, and a second discharge motor M42 for moving the pusher 42 in the Y direction.

In the present discharger 4, a first slider 44 guided along a fixed rail 43 is reciprocally moved in the X direction by the first discharge motor M41. The second discharge motor M42 is mounted on the first slider 44.

A second slider 45 is mounted on the first slider 44. As shown in FIGS. 10 and 11, the second slider 45 is guided along movement rails 46, and is reciprocally moved in the Y direction by the second discharge motor M42.

As shown in FIG. 11, the second slider 45 and the pusher 42 rotate along an oval-shaped loop around a pair of wheels 47 and 47, along with an endless chain 48, which is wound around the pair of wheels 47 and 47.

Figure 1B:
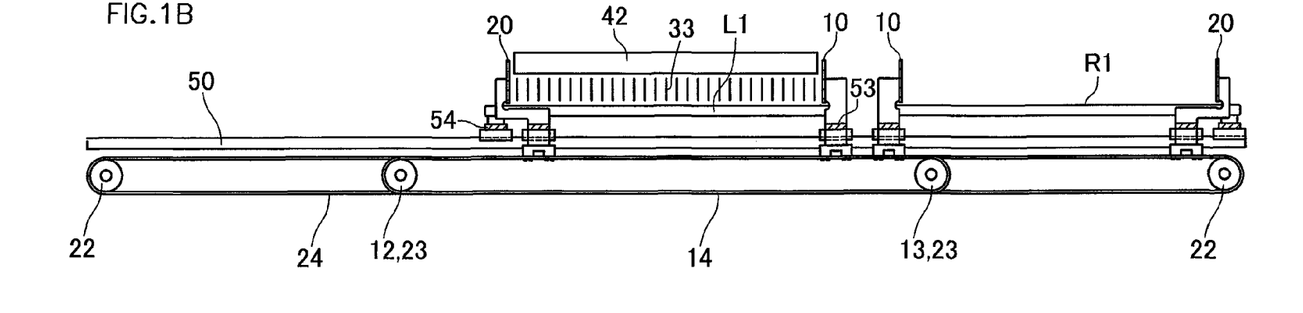
FIG. 1B is a schematic front view showing the same.

Such a loop-shaped traveling path of the pusher 42 may be employed also with the above embodiment of FIG. 1.

The pusher 42 with the loop-shaped traveling path can avoid interference with the following article set $W_2$ when returning in the direction opposite to the Y direction after discharging the preceding article set $W_1$ by pushing the back surface thereof in the Y direction.

When discharging the article set W, the velocity of the pusher 42 in the Y direction at the discharging end is reduced, thereby increasing the precision of the position at which the article set W is pushed out.

While preferred embodiments have been described above with reference to the drawings, various obvious changes and modifications will readily occur to those skilled in the art upon reading the present specification.

For example, there may be only one the transfer bed L1, R1, or the counter 3 of FIG. 1 may further include another pair of transfer beds provided on the opposite side of the gathering position P.

While timing belts can be employed as the first and second belts, other belts may be used.

While toothed pulleys can be employed as the wheels, other wheels may be used.

Thus, such changes and modifications are deemed to fall within the scope of the present invention, which is defined by the appended claims.

INDUSTRIAL APPLICABILITY

The present invention is applicable to transfer of an article set that can be compressed.

REFERENCE SIGNS LIST

3: Counter
4: Discharger
10: First support section
11: First output shaft
12: First driving wheel
13: First driven wheel
14: First belt
20: Second support section
21: Second output shaft
22: Second driving wheel
23: Second driven wheel
24: Second belt
41: Guide rail
42: Pusher
C: Article
L1: First transfer bed
R1: Second transfer bed
$M1_L$, $M1_R$: First motor
$M2_L$, $M2_R$: Second motor
P: Gathering position
P0: Receiving position
P1,P2: Hand-over position
S1: First side surface
S2: Second side surface
W,$W_1$,$W_2$: Article set
X: Reciprocating direction

The invention claimed is:

1. A device for aligning and transferring articles, comprising:
   a counter for aligning, at a gathering position, an article set composed of a predetermined number of uncompressed articles;
   a discharger for discharging the article set aligned at the gathering position to a receiving position;
   at least one transfer bed for supporting a bottom surface of the article set and reciprocating between the receiving position and a hand-over position, thereby receiving the article set at the receiving position, transferring the article set to the hand-over position, and returning to the receiving position;
a first support section fixed to the transfer bed to be in contact with a first side surface of the article set for supporting the first side surface;
a second support section attached to the transfer bed so as to be movable in a direction in which the transfer bed reciprocates for compressing the article set by moving toward the first side surface while being in contact with a second side surface of the article set opposite to the first side surface;
a first motor for reciprocally moving the transfer bed;
a second motor for reciprocally moving the second support section with respect to the transfer bed while the transfer bed is reciprocally moved; and
a control device for controlling a distance between the first support section and the second support section by controlling rotation of the first and second motors.

2. A device for aligning and transferring articles according to claim 1, wherein:
the control device controls rotation of the second motor so that the second support section moves closer to the first support section to compress the article set while the transfer bed transfers the article set from the receiving position to the hand-over position; and
the control device controls rotation of the second motor so that the second support section moves away from the first support section in preparation for receiving the article set at the gathering position between the first support section and the second support section, while the transfer bed returns from the hand-over position to the receiving position.

3. A device for aligning and transferring articles according to claim 2, wherein:
the at least one transfer bed comprises a first transfer bed and a second transfer bed, with the first and second motors provided for each of the transfer beds;
the first transfer bed supports a bottom surface of one article set and reciprocates between the receiving position and a first hand-over position, thereby receiving the one article set at the receiving position and transferring the one article set to the first hand-over position; and
the second transfer bed supports a bottom surface of another article set and reciprocates between the receiving position and a second hand-over position, thereby receiving the other article set at the receiving position and transferring the other article set to the second hand-over position.

4. A device for aligning and transferring articles according to claim 3, further comprising:
a first driving wheel attached to a first output shaft of each of the first motors;
a second driving wheel attached to a second output shaft of each of the second motors;
a first driven wheel provided for each of the first driving wheels;
a second driven wheel provided for each of the second driving wheels;
a first belt wound around between each of the first driving wheels and each of the first driven wheels for transmitting power for moving the transfer bed; and
a second belt wound around between each of the second driving wheels and each of the second driven wheels for transmitting power for moving the second support section, wherein:
the first and second driven wheels with the first and second belts wound therearound for transmitting power to the first transfer bed and the second support section thereof are rotatably attached to the first output shaft of each of the first motors provided for moving the second transfer bed; and
the first and second driven wheels with the first and second belts wound therearound for transmitting power to the second transfer bed and the second support section thereof are rotatably attached to the first output shaft of each of the first motors provided for moving the first transfer bed.

5. A device for aligning and transferring articles according to claim 4, wherein:
the counter aligns together articles while moving the articles from upstream to downstream along a reciprocation direction of the transfer bed; and
the discharger includes a guide rail diagonally inclined toward an article transfer direction of the counter as the guide rail extends from the gathering position toward the receiving position, and a pusher for moving diagonally in a direction in which the guide rail extends, thereby pushing out the article set toward the receiving position.

6. A device for aligning and transferring articles according to claim 1, wherein:
the counter aligns together articles while moving the articles from upstream to downstream along a reciprocation direction of the transfer bed; and
the discharger includes a guide rail diagonally inclined toward an article transfer direction of the counter as the guide rail extends from the gathering position toward the receiving position, and a pusher for moving diagonally in a direction in which the guide rail extends, thereby pushing out the article set toward the receiving position.

7. A device for aligning and transferring articles according to claim 1, further comprising:
a driving wheel attached to an output shaft of the second motor;
a driven wheel provided for the driving wheel;
a belt wound around between the driving wheel and the driven wheel for transmitting power for moving the second support section;
a movable bracket connecting between the belt and the second support section for reciprocally moving the second support section using rotation of the second motor via the belt; and
a slit formed in the transfer bed, extending in the direction in which the transfer bed reciprocates, wherein:
the driving wheel, the driven wheel and the belt are arranged at a position below the transfer bed;
the second support section is arranged above the transfer bed; and
the bracket is running through the slit in an up-down direction, whereby the belt below the transfer bed and the second support section above the transfer bed are coupled together.

* * * * *